United States Patent [19]
Kosowsky et al.

[11] Patent Number: 5,592,538
[45] Date of Patent: Jan. 7, 1997

[54] TELECOMMUNICATION DEVICE AND METHOD FOR INTERACTIVE VOICE AND DATA

[75] Inventors: Richard P. Kosowsky, Boston, Mass.; Michael P. Santullo, Palo Alto, Calif.; Michael R. Kosowsky, Hancock, Me.

[73] Assignee: Momentum, Inc., Boston, Mass.

[21] Appl. No.: 28,959

[22] Filed: Mar. 10, 1993

[51] Int. Cl.$^6$ .......................... H04M 11/00; H04M 1/00
[52] U.S. Cl. .............................. 379/93; 379/96; 379/97; 379/98; 379/88; 379/355
[58] Field of Search .................. 379/93, 94, 96, 379/97, 98, 100, 88, 89, 355, 356, 357, 142, 53, 54, 92, 354; 358/437; 395/575; 371/8.2; 374/222

[56] References Cited

U.S. PATENT DOCUMENTS

| | | | |
|---|---|---|---|
| 4,150,254 | 4/1979 | Schussler et al. | 179/2 |
| 4,289,930 | 9/1981 | Connolly et al. | 179/2 |
| 4,436,962 | 3/1984 | Davis et al. | 179/18 B |
| 4,436,963 | 3/1984 | Cottrell et al. | 179/18 B |
| 4,649,563 | 3/1987 | Riskin | 379/97 |
| 4,674,112 | 6/1987 | Kondraske et al. | 379/96 |
| 4,839,919 | 6/1989 | Borges et al. | 379/96 |
| 4,860,342 | 8/1989 | Danner | 379/96 |
| 4,868,865 | 9/1989 | Ogawa et al. | 379/100 |
| 4,899,377 | 2/1990 | Bauer et al. | 379/355 |

(List continued on next page.)

FOREIGN PATENT DOCUMENTS

| | | | |
|---|---|---|---|
| 0326366A2 | 8/1989 | European Pat. Off. | 379/96 |
| 0392816 | 10/1990 | European Pat. Off. | 375/222 |
| 0493084 | 7/1992 | European Pat. Off. | 379/53 |
| 2035017 | 6/1980 | United Kingdom . | |
| 2156187 | 10/1985 | United Kingdom | 379/100 |

OTHER PUBLICATIONS

"For the 90's, Screen–Based Phones," The New York Times, p. 8 Dec. 13, 1993.
VoiceView 992, 1992 slide display May 4–6, 1993 Informart, Dallas.
"Telecom Developers 93" ITT Northern Telecom, New product and service slides, displayed May 4–6, 1993 Telecom Dev. '93 Infomart.
"Analog Display Services Interface" slide display May 4–6, 1993, Infomart, Dallas, by Dialogic Corp.
"AT&T Smart Phone," AT&T Network Systems (Marketing), Jun., 1991.
"The Huntington and AT&T To Market Revolutionary Smart Phone" News Release, Oct. 1, 1991.
Voice '92, "Improving the User Interface to Enhance Services", 1992.

(List continued on next page.)

*Primary Examiner*—Jason Chan
*Attorney, Agent, or Firm*—Wolf, Greenfield & Sacks, P.C.

[57] ABSTRACT

A telecommunication device permits mixed voice communication and data communication during a single telephone call. The device switches freely between bidirectional voice communication and bidirectional data communication, as required by the data to be communicated. The dynamic switching between voice communication and data communication is arranged so that voice communication is minimally interrupted. Data communication using the device includes creation, transmission, reception, storage, retrieval, display and use of data messages such as address and telephone number records. The device is inexpensive to produce and uses existing standards for signalling by telecommunications equipment. A complete interactive voice and data (IVD) system automatically performs data communication between IVD subscriber systems, or between an IVD subscriber system and an IVD host system. Further, in conjunction with a standard IVR, a complete IVR/IVD system automatically performs data communication with IVD subscriber systems and IVR voice communications with non-IVD subscriber systems.

39 Claims, 6 Drawing Sheets

U.S. PATENT DOCUMENTS

| | | | |
|---|---|---|---|
| 4,939,767 | 7/1990 | Saito et al. | 379/53 |
| 4,991,199 | 2/1991 | Parekh et al. | 379/97 |
| 4,994,926 | 2/1991 | Gordon et al. | 379/100 |
| 5,008,927 | 4/1991 | Weiss et al. | 379/98 |
| 5,008,930 | 4/1991 | Gawrys et al. | 379/96 |
| 5,025,373 | 6/1991 | Keyser, Jr. et al. | 364/408 |
| 5,050,207 | 9/1991 | Hitchcock | 379/96 |
| 5,063,587 | 11/1991 | Semosa et al. | 379/96 |
| 5,086,453 | 2/1992 | Senoo et al. | 379/100 |
| 5,101,427 | 3/1992 | Kotani et al. | 379/355 |
| 5,109,407 | 4/1992 | Fujita et al. | 379/53 |
| 5,138,649 | 8/1992 | Kisbergh et al. | 358/85 |
| 5,153,897 | 10/1992 | Sumiyoshi et al. | 379/93 |
| 5,157,717 | 10/1992 | Hitchcock | 379/96 |
| 5,164,981 | 11/1992 | Mitchell et al. | 379/88 |
| 5,164,982 | 11/1992 | Davis | 379/96 |
| 5,165,096 | 11/1992 | Matsumoto | 379/92 |
| 5,195,130 | 3/1993 | Weiss et al. | 379/98 |
| 5,200,988 | 4/1993 | Riskin | 379/52 |
| 5,280,520 | 1/1994 | Abe | 379/100 |
| 5,283,818 | 1/1994 | Klausner et al. | 379/89 |
| 5,321,840 | 6/1994 | Ahlin et al. | 395/700 |
| 5,329,589 | 7/1994 | Fraser et al. | 379/93 |
| 5,349,635 | 9/1994 | Scott | 379/93 |
| 5,365,577 | 11/1994 | Davis et al. | 379/96 |
| 5,369,700 | 11/1994 | Koura et al. | 379/96 |
| 5,450,472 | 11/1995 | Brax | 379/100 |

OTHER PUBLICATIONS

"Voiceband Data Transmission Interface Generic Requirements," Bell Comm. Research, Tech. Ref. #TR–NWT–000030, Oct. 2, 1992.

"Generic Requirements for an SPCS to Customer Premises . . . ," Bell Communications Research, Tech Advisory Ta–NWT–001273, Feb. 92.

"ADSI Protocol Overview", Northern Telecom 58105, Feb. 4, 1993, Issue 1 printed Apr. 1993.

"Telephony" An Interface Publication May 25, 1992.

"Funds Transfer Report", Mar. 1992, A Bankers Publication.

"Super Phones In The US", Ele. Payments International, Issue 64 Apr. 1992.

"Bank Advertising News" vol. 17, No. 11, Nov. 16, 1992 New article on MNC telephone banking program.

The Washington Post, Mar. 27, 1992, article about phones that allow customers to review their balance.

Brochure for A Home Banking System from "Online Resources", 1313 Dolley Madison Blvd., McLean, VA 22101.

"Educate Your Market for Home–Banking", DeLone et al. Bank Marketing Nov. 1992.

"Renewed Push for Pay–by–Phone", Michael Quint, Business Day, Mar. 7, 1992, part of the New York Times.

"Information & Interactive Services Report", Gary H. Arlen, Mar. 27, 1992.

"The PC Comes to Telecom", Harry Newton, 1993 May Teleconnect.

Brochure from Online Resources & Comm. Corp., 1313 Dolley Madison Blve., McLean, VA 22101.

Product information on Visualization of Communication, Radish 1705 14 St., S184, Boulder, CO 80302, 1992.

"Data Over Voice", Johana Till Johnson, Data Comm., Jun. 1992.

"VoiceView", Radish Comm. Sys., Inc. Cat. No. 992, 1992.

"Voice and Data Put On One Line, Sans ISDN", Communications Radish Comm. Sys., Inc. Comm. Week, May 18, 1992.

"VoiceView", Madeline Bodin, Call Center Magazine Dec. 1992.

TELECOMMUNICATION DEVICE AND METHOD FOR INTERACTIVE VOICE AND DATA

BACKGROUND OF THE INVENTION

1. Field of the Invention

This invention relates generally to telecommunications equipment and software. More particularly, the invention relates to customer premise equipment and service provider equipment for effecting both voice and data communication through existing public switched telephone networks, including mixed voice and data communication between a variety of equipment configurations, and management and display of data communicated.

2. Discussion of the Prior Art

Conventional voice telephones and the public switched telephone network (PSTN) are well-known to citizens of today's world. Indeed, telephone systems ranging from the simple instrument purchased for home use to very sophisticated business systems are in widespread use. Among the systems seeing increased use among several market segments is the interactive voice response (IVR) system. An IVR provides an interactive voice session between customer and business in which the business end of the call generates voice messages through recording or synthesizing techniques, and the customer interacts using a telephone keypad or through voiced statements and voice recognition.

One generic example of an IVR is the type used by large banks to give their retail customers instant telephone access to account information. Such a system may give information by voice to the customer or may perform various banking transactions, responsive to commands keyed into the customer's telephone keypad. For example, the customer may inquire as to account balances and may transfer funds from one account to another. The customer's telephone keypad must be of the tone type, which is capable of generating twelve dual-tone multi-frequency (DTMF) signals out of a standard sixteen. The standard DTMF signals are designated "1"–"9", "0", "*", "#" and "A"–"D". Each comprises one of four high frequency tones superposed on one of four low frequency tones. The DTMF standard is contained in "American National Standard for Telecommunications - - - Interface Between Carriers and Customer Installations - - - Analog Voicegrade Switched Access Lines Using Loop-Start and Ground-Start Signaling", ANSI T1.401-1988, and in "Dual-Tone Multifrequency Receiver Generic Requirements for End-to-End Signaling Over Tandem-Switched Voice Links", Issue 1, TR-TSY-000181, Bellcore, March 1987.

To begin a typical IVR transaction the customer calls the bank's IVR system from any telephone capable of generating DTMF signals. The IVR system issues one or more requests for commands or information, the requests being in the form of pre-recorded or synthesized voice messages. By responding with appropriate DTMF signals, the customer may navigate through a series of menus or lists of such requests until the desired information is delivered to the customer as a pre-recorded or synthesized voice message. One problem with IVR systems such as described above is that the communication bandwidth of the spoken messages from the IVR is so low as to be a significant frustration to experienced users. Indeed, if a menu of commands contains a large number of choices, it may even be difficult to recall the appropriate one at the time for making a selection. Navigating a complex series of menus to retrieve some information can be time-consuming as well. Further, having navigated the system once doesn't make subsequent navigations any easier, except, possibly, that the user may write down or remember the sequence of keystrokes that brings a desired result.

Some solutions have been proposed, but each has a significant cost or drawback.

One way to make the described type of communication easier is to use a visual data based system, such as a personal computer (PC) and modem, in connection with an information retrieval service. However, personal computers are still a significant expense, to which many individuals may have only limited access. In contrast, telephones are ubiquitous and inexpensive to acquire. A further drawback to using PCs and modems to access customer information, such as bank balances, is that on occasion the content of the information retrieved precipitates the need for the customer to communicate with service provider personnel. While the modem-equipped PC is in use, the telephone line is unavailable for voice communication. A desirable solution would permit mixed voice communication and data communication during a single telephone call.

Another proposed solution would be to make use of the emerging Integrated Switched Digital Network (ISDN) standards and equipment to effect simultaneous or near-simultaneous voice and data based communication. However, this solution requires significant investment in new equipment by service providers, service customers and the telephone companies. A desirable solution would be available to the general public at low cost.

Screen-based telephones are another emerging solution to the problems noted above. However, current screen-based telephones do not provide bidirectional, mixed voice and data communications during a single telephone call, wherein data communication may be initiated and terminated by either the calling party or the called party. Further, when prior art screen-based telephones are receiving data, the telephone keypad is disabled, preventing user response until the data communication has been completed.

An Analog Display Services Interface (ADSI) has been developed by BELLCORE for use by the various local Bell Operating Companies and various service providers. Devices compatible with the ADSI communication standard are currently under development, but specific device capabilities are not indicated in the ADSI standard and are presently unknown. The ADSI standard does call for the use of non-standard DTMF tones (i.e. not one of "1"–"9", "0", "*", "#" and "A"–"D") for session initiation. Thus, devices implementing the ADSI standard rely on the use of non-standard hardware, preventing communication with unmodified equipment currently in use. Furthermore, the ADSI standard calls for simplex data communication, wherein customer premises equipment cannot originate data communication. Further, ADSI requires a data session to begin using the signals complying with the Bell 202 data communication standard which is incompatible with existing PC modems.

Another area of art of interest in connection with the present invention includes telephone autodialer systems and electronic personal organizers. These are electronic devices which provide one or more functions including the creation, storage, display and transfer of telephone number station and address information. Telephone number information may include dialing prefix information, area codes, country codes, telephone numbers and auxiliary telephone numbers, as well as any other information required to properly dial a telephone number. Address information may include a person's name, a person's title, the name of a business at which a person works, street address information and other miscellaneous information which may be useful in the context of a telephone directory.

Some devices currently available can autodial a previously stored telephone number. Thus, in addition to functioning as a conventional personal telephone directory, the device can reduce dialing errors by automatically generating the sequence of DTMF tones corresponding to a stored telephone number.

However, devices such as described above do not provide a means for transferring selected telephone number information and address information to another such device over the PSTN during a voice conversation. Thus, a user of such a device who is having a telephone conversation with another user of such a device cannot readily and simply transfer a record from the first user's device to the other user's device electronically. The user would instead recall the record to the device's display and read the information aloud to the other user who will manually enter that information into the other user's device. Although some such devices do provide a data transfer function, they are intended primarily for backup purposes and are limited to batch transfers of records using a special, dedicated, local data link. For example, special cables or an infrared link may be used.

Yet another area of art of interest in connection with the present invention includes "bookmark" functions and macro functions used by computer software applications, networks and communication software. In this context a bookmark is simply a record of certain state information, usually made by a software user, so that the same state can be easily recreated by the user at some point in the future. Macros are a form of software program, intended to accomplish a similar result to bookmarks. A macro is simply a record of a sequence of key strokes and/or pointing device actions designated by a user. Macros are often recorded as the user operates the software from an initial state to a final state. Thus, if the user places the software program into an initial state identical to the initial state from which a macro has been recorded, running the macro would produce the same final state as the user had previously achieved manually by entering the sequence of key strokes and/or pointing device actions. However, bookmarks and macros are stored as private data accessible only from within the application wherein they were created. Thus, they are difficult to transfer to other users of the same software.

SUMMARY OF THE INVENTION

Accordingly, the present invention will provide mixed communication by both voice and data including visual text messages during a single telephone call. Further in accordance with the present invention, both modes of communication may be bidirectional. Yet further in accordance with the present invention, the apparatus will not require individuals to discard the telephone equipment in which they have already invested.

In accordance with another aspect of the present invention, there is provided an interactive voice and data (IVD) subscriber system, any two of which may communicate with each other, and optionally an IVD host system which allows IVD subscriber system unit to IVD host communication. The IVD subscriber system and host are compatible with the PSTN for voice communication.

In accordance with another aspect of the present invention, there is provided data management facilities for enabling the exchange of data with other devices. Data from a database may be selected, transmitted, received, merged, displayed and otherwise used by devices according to this aspect of the present invention. The data managed may include telephone number data, such as found in a telephone directory. Thus, devices may exchange telephone number data corresponding to either connected party or third parties. Furthermore, the data managed may include state information, where a device communicated with includes capability of identifying which of a plurality of states its controlling software is in. By obtaining such state information and providing for the exchange of such state information, users of common devices with similar usage patterns may share data for rapidly returning to a commonly used state.

BRIEF DESCRIPTION OF THE DRAWING

The present invention will be further understood in connection with the accompanying drawing wherein like numerals refer to like elements and wherein.

DETAILED DESCRIPTION

A detailed description will now be given of several aspects and embodiments of the present invention.

Figure 1:
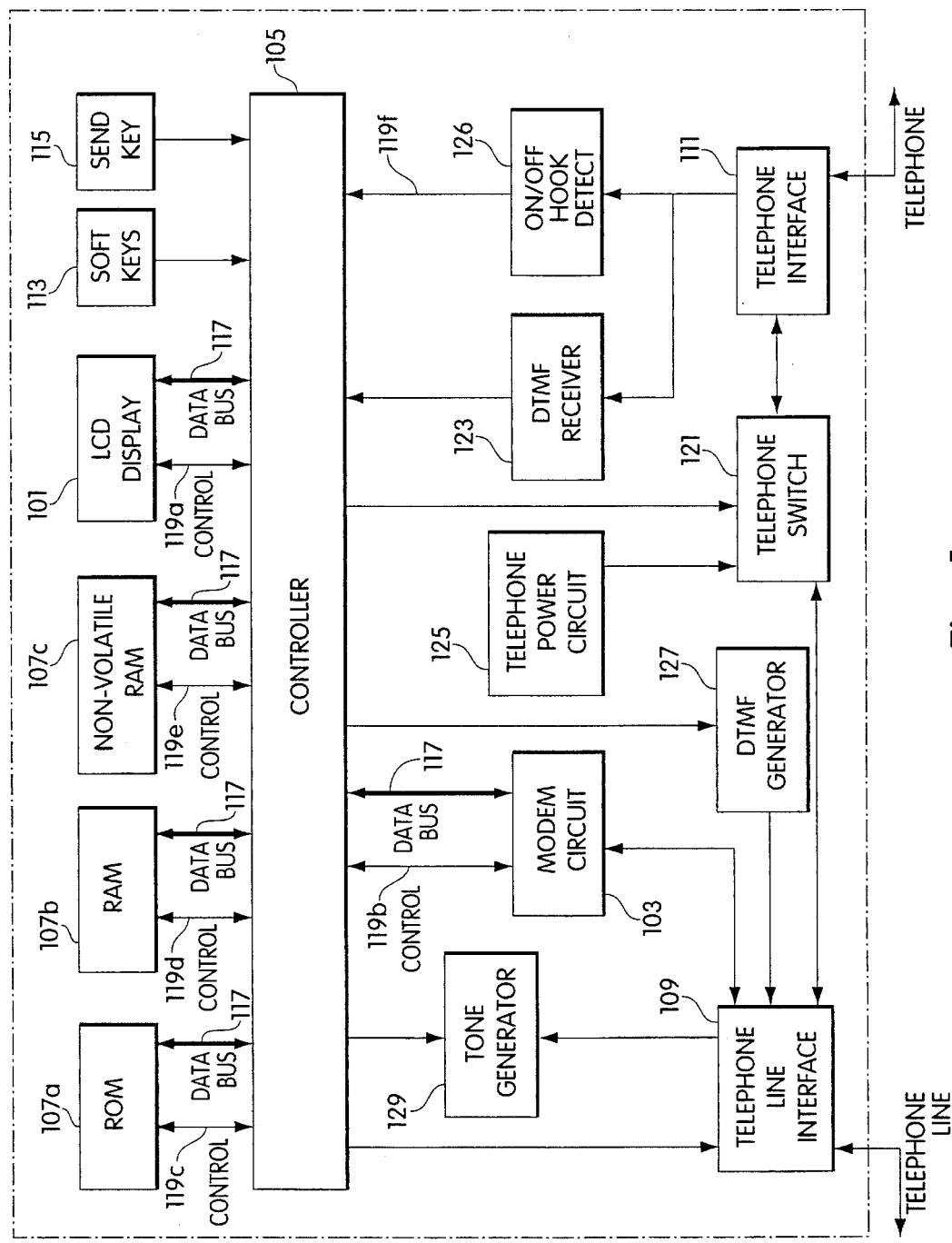
FIG. 1 is a block diagram of one embodiment of the present invention.

A device constructed according to the present invention is shown in block diagram form in FIG. 1. This block diagram is generic to several alternate embodiments, and so alternative embodiments of portions of the system will be described when appropriate. For example, the invention may be practiced by installing a plug-in module and a special software program within a personal computer system, or the invention may be practiced as a stand-alone device. Such different embodiments may have different construction details. The main components of a device according to this invention include a display 101, a modem chip 103, a controller chip 105, memory 107a–107c, and various interface devices, including a telephone line interface 109, a telephone interface 111 and user interface keys 113 and 115. The illustrated embodiment will now be described in greater detail.

Display 101 may be, for example, a multi-line, multi-character liquid crystal display (LCD), such as is commonly used in calculators and hand held computers. The display could include graphics display capability as well as data display capability, if so desired. A suitable size for a small data display of the required type is 8 lines of 40 characters each, although any convenient size may be used. If the invention is to be practiced using a PC, the monitor screen may form a suitable display 101.

Information to be displayed is transferred to the display 101 by the controller 105 over a data bus 117. Also associated with the display 101 are a group of control signals 119a for instructing the display 101 regarding the display of information transferred. In this embodiment, it is assumed that the display includes local memory for holding the transferred information to be displayed. Other conventional display and display memory management techniques known to those skilled in the art may be employed. For example, the display memory may be part of system memory, with controller 105 transferring display content directly from system memory to the display as needed. (See the memory map of FIG. 4, for example.)

Modem circuit 103 is used for performing fast, bidirectional, digital data communication between the device of the invention and another device to which it is connected through the PSTN. The modem circuit 103 is connected to controller 105 for digital communication through the data bus 117 and a group of control signals 119b. The modem circuit 103 is further connected for communication of digital information over the telephone line through telephone line interface 109. Thus, controller 105 may send or receive digital information, such as data information encoded in a standard interchange format, for example ASCII, by transferring appropriate commands and data to the modem circuit 103.

The modem circuit 103 may be a conventional chip. In the embodiment described, it is preferred that the chip used for modem circuit 103 comply with certain standards and requirements. The modem circuit 103 should comply with current versions of the communications standards Bell 103J, Bell 212A, CCITT V.22 and CCITT V.22bis. The Bell communications standards were last published by the pre-divestiture AT&T as publications No. 41106 and 41214, respectively. The CCITT standard was published in the "CCITT Red Book: Data Communications over the Telephone Network: Recommendation of the V Series", Volume VIII, Fascicle VIII.1, V.22 and V.22bis. By so doing, the modem circuit 103 will be compatible with a wide variety of other devices. The selected modem circuit 103 should be capable of operating in answer or originate mode. The importance of this capability will be seen below, when the state diagram of the software of this embodiment is discussed in connection with FIG. 2.

Controller 105 may be any of a number of readily available microprocessor circuits. In embodiments where the device is intended to be a stand-alone unit, microprocessors such as type 8051, manufactured by INTEL, or other, similar units may be suitable.

Alternatively, controller 105 may be a personal computer or the processor portion of a personal computer, having the other elements shown connected thereto. For example, controller 105, memory elements 107a–107c, display 101 and user interfaces 113 and 115, all connected by data bus 117 and control signals 119a–119e comprise typical components of a personal computer system. The balance of the elements, particularly including modem circuit 103, telephone line interface 109 and telephone interface 111, could be located on a plug-in module, also connected to the controller 105 through data bus 117 and the set of control signals 119b. Or, the balance of the components could be located in a modem attached to the personal computer, if the modem is capable of handset exclusion, that is isolation of an attached telephone from receiving modem tones, and of DTMF tone recognition and generation. The read only memory (ROM) 107a, the random access memory (RAM) 107b and the non-volatile RAM (NV RAM) 107c in an embodiment not part of a personal computer may be of any conventional type convenient to the application. One arrangement of data and program information within the memories 107a–107c is discussed below in connection with FIG. 5, where ROM 107a holds a system program, RAM 107b holds transient data and NV RAM 107c holds a database of telephone number and other data. The precise arrangement of this memory space will depend upon the design choices of the implementer.

Having a database of information readily accessible in the device's memory allows a user to transmit commonly used data at the touch of a single button, without having to compose the message anew each time it is required. One example of such a situation occurs when a service provider asks a caller to identify themselves. Basic identifying information, perhaps omitting a secret personal identification number (PIN), could be sent as a data message, without requiring the caller to speak or type their name and address each time the service provider requests it. This reduces the time spent identifying the caller and reduces the likelihood that an error will be made in the identification data. A further example of such a situation occurs when a caller first connects to a service. Coupled with a database entry used to dial the call could be data hereinafter called a bookmark, which when transmitted to the service provider may indicate an extension the caller wishes to connect to, or may indicate which service provider function the caller seeks to access. Bookmarks are described in greater detail below.

This database, in one embodiment of the invention, is divided into three parts. The first comprises personal information data records, such as the name and address of the device's owner. Note that there may be multiple instances of each type of personal information data record, for example the name and workplace telephone number of each family member may be stored. The second part comprises address book data records, which are telephone number and other related data, such as names and addresses. These data records may be used to automatically dial out to the other parties and may be sent and received between devices, allowing one user to augment his address book by receiving records from another. The third part of the database comprises notes, which are freely formatted text messages that may be sent and received between devices.

Alternatively, some part of RAM 107b or NV RAM 107c may be a stand-alone personal information manager (PIM) connected through an option port or communication port to data bus 117. For example, a SHARP OZ-8000 series device or a CASIO B.O.S.S. device could be used to store an address book with telephone numbers, a note file and personal identification information. PIMs are tailored for the storage of these types of information. Interfaces between the SHARP or CASIO PIMs and other devices such as PCs are commercially available. Another PIM configuration might include a PIM application running on a standard PC (e.g. ACT! or Packrat).

The telephone switch 121 is controlled by controller 105. The switch 121 functions to connect the telephone interface 111 to either the telephone line interface 109 or the telephone power circuit 125. Thus an externally attached telephone may be selectively connected to or disconnected from the telephone line. When disconnected, the telephone will still receive the power ordinarily provided by the telephone line, which, for example, is often necessary for the phone to be able to generate DTMF tones.

DTMF receiver 123 is connected to telephone interface 111. It can detect DTMF tones generated by the attached telephone at all times, and, whenever the telephone switch 121 connects the telephone interface 111 to the telephone interface 109, it can also detect tones generated by the party connected over the telephone line. The ability to detect remotely generated tones is used in data session initiation to be described below in connection with FIGS. 2 and 3 below.

The ability to detect tones generated by the attached telephone is used in several instances. For example, whenever data communication is in progress and the telephone is disconnected from the telephone line interface, DTMF receiver 123 can inform controller 105 of any tones generated by the user of the attached telephone, and controller 105 can transmit a message through modem 103 to the connected service. Thus, the local system can inform the remote system of telephone keypad hits without having to pass the DTMF tone itself, and the system need not interrupt ongoing data communications.

In order that embodiments of the present invention respond correctly to an attached telephone going on or off hook, there may be an on/off hook detector 126, responsive to the switch hook state of an attached telephone connected to the telephone interface 111. On/off hook detector 126 may communicate the switch hook state of an attached telephone to controller 105 via a status line 119*f*. Further, the on/off hook detector 126 or the controller 105 may include means for measuring time intervals of on hook and off hook activity, thereby providing the capability to detect pulse dialing signals generated by the attached telephone, analogous to the capability to detect DTMF tones as described above.

A device according to some embodiments may include several additional features. In addition to DTMF receiver 123, there may be a DTMF generator 127. This separate DTMF generator 127 may be desirable when modem circuit 103 is incapable of generating DTMF tones itself. Like modem circuit 103, DTMF generator 127 is responsive to commands from controller 105. Finally, some embodiments may include an audio tone generator 129. The tone generator 129 may be responsive to signals on the telephone line or to commands from the controller 105, so as to provide a user of the device with audio feedback in response to various actions.

In a typical application of the device, the display 101 can be used to present menus to the user. The menus may be navigated via telephone keys which produce DTMF tones, via telephone means which produce pulse dialing signals (as discussed above in connection with on/off hook detector 126) or via soft keys 113. For example, soft keys 113 could be located adjacent to the display 101. Thus, items on display 101 could indicate soft keys 113 to press to invoke IVD functions. Alternatively, soft keys 113 could be implemented as a touch screen directly overlaying display 101. Thus, a menu communicated as a data message to the device could form its own input mechanism. Other input devices, including but not limited to light pens, digital mice, and track balls could be used to implement soft keys 113 as virtual keys on display 101 or otherwise. Still other input devices, such as keyboards and bar code readers, could be used for data entry to the device for both responding to queries from IVD host systems and for storing and editing messages for later transmittal.

The software program method by which mixed voice communication and data communication is achieved according to the present invention is next generally described with reference to the state diagram of FIG. 2. The following description relates primarily to a stand-alone embodiment of the invention. Differences between such an embodiment and an embodiment in an existing PC are mentioned as they occur.

When a telephone (hereinafter, we shall assume the telephone is a conventional voice telephone, although it could have other additional capabilities of its own) connected to telephone interface (FIG. 1, 111) of a device according to this embodiment of the invention is on hook, that is, when the voice telephone is not in use, the device remains in the on hook state 201. Also, regardless of which state the device is in, the device returns to the on hook state 201 whenever the telephone handset is placed on hook. An exception to this rule exists when it is desirable for information just received over the telephone line to be perused after the call is completed. In this case, the device transitions from voice session state 203 into the local mode state 204 when the phone is placed on hook.

When the voice telephone goes off hook, that is, when a user has lifted the receiver of the voice telephone, then control moves to a state of idle 202. The PC embodiment would be activated by a user command rather than a physical telephone going off hook. However, the PC embodiment would typically include commands corresponding to off hook and on hook for activating and deactivating a communication session.

The idle state 202 allows the user to dial an outgoing call using either of two methods. The first is the standard method of dialing a number using the telephone keypad. By manually dialing, and then being connected to another standard telephone device through the PSTN, the device enters the voice session state 203. During the transition from idle state 202 to voice session 203, the switch (FIG. 1, 121) permits voice signals to pass through the device between the telephone line via the telephone line interface (FIG. 1, 109) and the voice telephone via the telephone interface (FIG. 1, 111). The second method for dialing an outgoing call is by transitioning from the idle state 202 to the local state 204 by selecting a soft key (FIG. 1, 113) which is currently associated with an option to transition to the local state by text shown on the display (FIG. 1, 101). By pressing the soft key which corresponds to the local option on the display (FIG. 1, 101), the controller (FIG. 1, 105) causes the device to enter local state 204. In the PC embodiment, local state would be activated by a user command analogous to pressing a soft key (FIG. 1, 113).

In the local state 204, a software program may be executed by the controller (FIG. 1, 105) permitting such local actions as selecting and dialing a telephone number stored in the address book, setting device configuration parameters, and editing the database described above.

Figure 5:
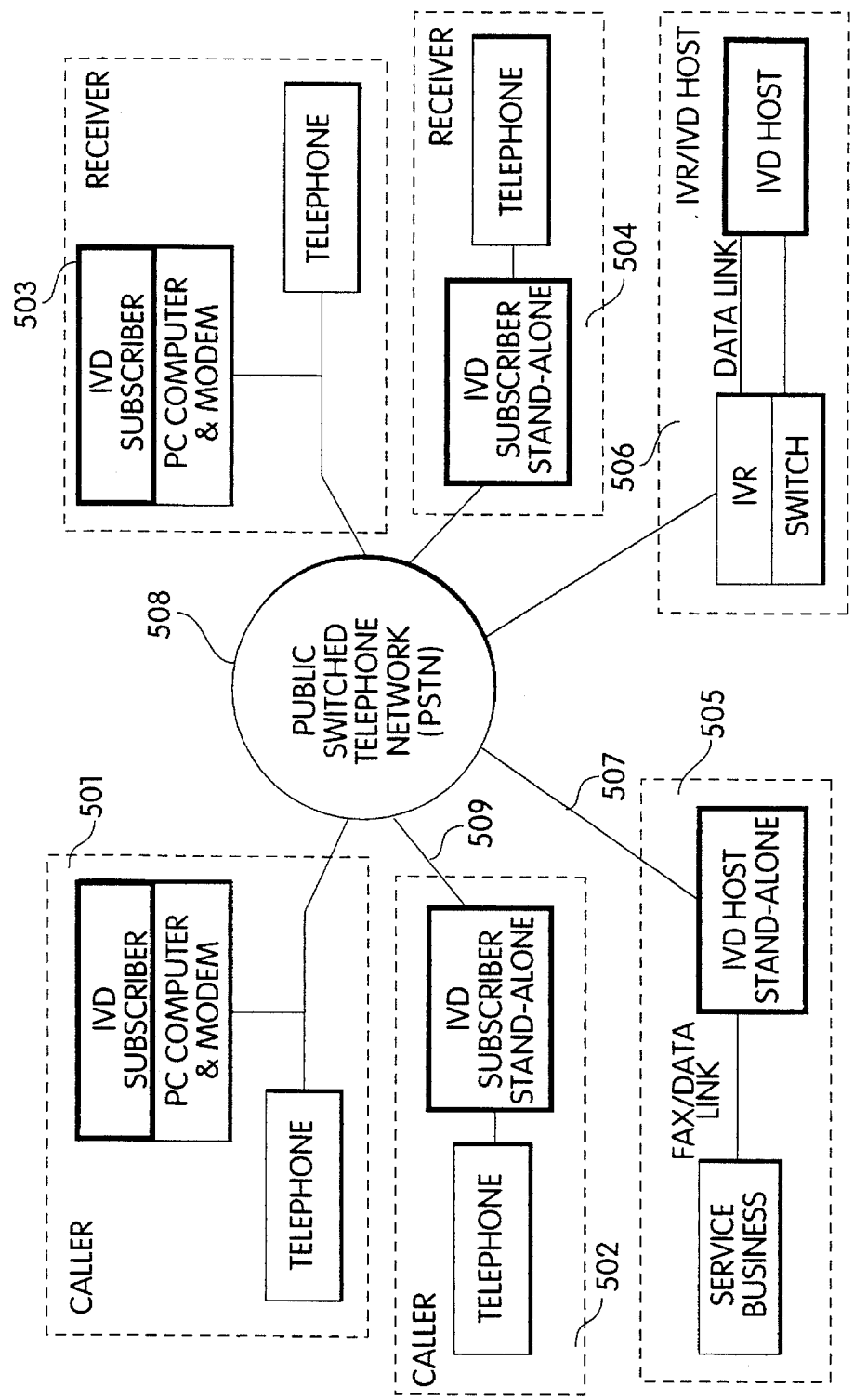
FIG. 5 is a general system diagram of some components of a complete system, including stand-alone and PC based IVD subscriber systems, a stand-alone IVD host system, and a IVD host system operated with a standard IVR host system.

To automatically dial a telephone number, the local state may allow the user to search a database of address book entries (see, for example, FIG. 5, 521). In one embodiment, the device displays the names and numbers of all the entries that contain a telephone number on the LCD display (FIG. 1, 101). By selecting an option using the telephone keypad, the user indicates which entry to autodial. Once an indication has been made by the user, the device controller (FIG. 1, 105) obtains the telephone number from the data record selected and may pass the number to the DTMF generator (FIG. 1, 127) wherein DTMF tones representing the telephone number are generated and pass to the telephone line through the telephone line interface (FIG. 1, 109). Alternatively, some embodiments may pass the number to a modem circuit (FIG. 1, 103) capable of generating dialing pulses or DTMF tones, or may pass the number directly to the telephone line interface (FIG. 1, 109) which may issue pulse dial signals by switching the device on and off hook in the required sequence.

The local state may allow the user to set device configuration parameters. Device configuration parameters may include the area code of the connected telephone, to be used in determining how to dial telephone numbers, any dialing prefixes necessary to dial out to the PSTN from the connected telephone, whether to use pulse dialing or DTMF dialing techniques and the current date and time for embodiments of the device that display date and time. Other parameters include user preferences, such as the language favored by the user for multilingual embodiments of the device and the style of interaction preferred by the user when the device presents alternative implementations. One example of alternative implementations is whether menu choices should be made by moving a cursor among choices displayed on the LCD display (FIG. 1, 101) using keys designated as cursor movement keys and then pressing a key designated as a selection key, or by using the telephone keypad to choose among menu entries labeled with the symbols on the telephone keypad (0 through 9, #, *). Another example is whether alphabetic characters, in the absence of a keyboard, should be entered by hitting the telephone keypad button where the letter appears, followed by 1, 2, or 3 indicating whether the letter is the first, second, or third letter on that key, for example "h" would be entered as "4 2", or by hitting the button where the letter appears once for the first letter on the button, twice for the second, or three times for the third, followed by the # button, where "h" would be entered as "4 4 #".

Local state also allows editing of the database. Editing functions applicable to the personal information records include creating and editing the records, and also creating selections from the set of records: in one embodiment of the invention the user will be able to link identifying text, for example "Mr. Smith at work", to a particular set of choices from among the personal information records: for example "name: Mr. Smith; address: Digital Phones, 200 Main Street; telephone: 901-555-2000". This linked group will be used to simplify the choice of particular data records in certain applications.

A local state function relevant to the storage of address book entries is the creation and storage of a telephone dialing string. To be used as an automatic dialer as described above, the device must be able to properly dial a destination number, which involves knowing whether to include the area code and whether to prefix the exchange with a "1" when dialing. While knowing the area code of the telephone to which the device is attached may solve the former problem in many cases, it is important that the device's user can specify whether or not to use a prefix for a particular destination.

Finally, there will be provision for browsing, editing, creating and removing notes in the local state, including provision for scrolling vertically and horizontally when the contents of a note exceed either dimension of the unit's display.

The local program may be ended by pressing a designated soft key 113 or by placing the receiver on hook and entering the on hook state 201. When the local mode program is ended without selecting a telephone number to autodial and thus entering the voice session state 203, the device returns to idle state 202. In general state changes will not be caused by placing the phone on hook in the PC based embodiments, but otherwise the actions and transitions of local mode will be similar to those described herein.

The device may enter the voice session state 203 directly from the on hook state 201 by taking the telephone physically off hook while answering an incoming call. This transaction represents the standard method for answering a telephone call with a telephone. During the transition from on hook state 201 to voice session 203, the switch (FIG. 1, 121) permits voice signals to pass through the device between the telephone line via the telephone line interface FIG. 1, 109 and the voice telephone (via the telephone interface FIG. 1, 111).

The voice session state 203 allows a user to communicate using standard voice signals and DTMF tones generated by standard telephones and users. The device simply passes all voice signals from the telephone line interface (FIG. 1, 109) through switch (FIG. 1, 121) to the telephone interface (FIG. 1, 111). However, the device according to the present invention can generate and receive all 16 standard DTMF tones, including the four tones designated "A", "B", "C" and "D", which are not normally generated by a telephone keypad. Other tones which may be detected are modem carriers from compatible modems. If none of the tones mentioned above is received during the voice session state 203, voice communication may continue until the voice telephone is placed on hook, at which time the device returns to the on hook state 201. Whenever the device exits the voice session state 203 into one of the states described below, the telephone switch (FIG. 1, 121) disconnects the voice telephone from the telephone line interface (FIG. 1, 109) so that DTMF and modem tones are not heard by the user.

In embodiments such as in a PC where dedicated communication with service providers is intended but means for DTMF tone recognition are not available, receipt of certain tones may be assumed after a brief pause during the voice session state 203. Such instances are mentioned below, where appropriate.

At any time during voice session state 203, a DTMF "A" tone may be detected. This indicates to the device receiving the "A" tone that the device sending the "A" tone which has been connected to through the PSTN is a compatible IVD subscriber or host system that wishes to perform data communication. The "A" DTMF tone may be considered an attention tone. Therefore, upon receiving the DTMF "A" tone, the receiving device sends a "B" tone. The "B" tone serves as an acknowledgment tone in response to the attention tone. The device then listens for the modem of the device connected to through the PSTN to send its carrier tone. Once a compatible modem carrier-tone is detected by the device modem (FIG. 1, 103), the device sends its own modem carrier tone by commanding the modem (FIG. 1, 103) to do so. This combination of actions transitions the device into the modem and protocol handshake state 205.

Either device may initiate the transition into the modem and protocol handshake state 205 from the voice session state 203 by sending the "A" tone to the other device. The sending device then waits for a "B" tone to be detected. Once a "B" tone has been detected, the sending device commands the modem to send its carrier tone. Upon the detection of the other device's carrier tone, the device enters the modem and protocol handshake state 205. The actions required to transition from the voice session state 203 to the modem and protocol handshake state 205 are detailed in the description of FIG. 3.

In the modem and protocol handshake state 205, the two devices connected through the PSTN perform standard modem handshaking suitable for use with, but not limited to, communications standards Bell 103J, Bell 212A, CCITT V.22 and CCITT V.22bis. One such handshaking standard is the EIA standard "Procedures for Automatic Interworking Between Automode Modems and Modems Conforming to Recommendations V.32, V.22bis, and V.22," EIA/TIA/IS-63. This handshake performed between the modems of the connected devices establishes the baud rate, as well as any error correction and data compression supported by the modems. Once the link parameters have been established by the modem handshake, the two devices exchange and agree upon communication parameters particular to this invention, such as the link and application layer protocol versions to be used during this session. Each device enters the data session state 206 upon the successful completion of the handshake.

During the data session state 206, the two devices connected through the PSTN have established a bidirectional full-duplex data communications link. The information passed from device to device is governed by the standard to which the link is operating (e.g. Bell 212A) and the link and application layer protocol agreed upon during the modem and protocol handshake state 205. The protocol is performed by the device controller through interactions with the modem and memory. The device exits the data session state 206 when either an end session command is detected or initiated by the user, or the carrier tone of the other device's modem is dropped. The device then enters the voice session state 203.

It should be readily understood from the above description that the device controls telephone switch (FIG. 1, 121) such that voice communication is enabled at all times except when data communication has been initiated. Once a particular data communication operation has been completed, the switch (FIG. 1, 121) again enables voice communication. Thus, the device permits the user to perform mixed voice communication and data communication during a single session or telephone call. Unlike conventional modems and PC communications systems, the data communication link is dynamically established and broken as necessary to facilitate both voice and data forms of communication.

Variations in the above described software program method for achieving mixed voice communications and data communications should now be apparent to those skilled in the art. For example, the signaling between devices for switching from voice communication to data communication and back has been described in terms of single DTMF tones. However, a more robust system may employ short sequences of DTMF tones for the same purpose. Thus, instead of sending simply "A" as the attention tone, a device may be required to send a sequence such as "ADB" as a more robust attention tone. Likewise, the acknowledgment tone may also be a sequence of DTMF tones.

Figure 2:
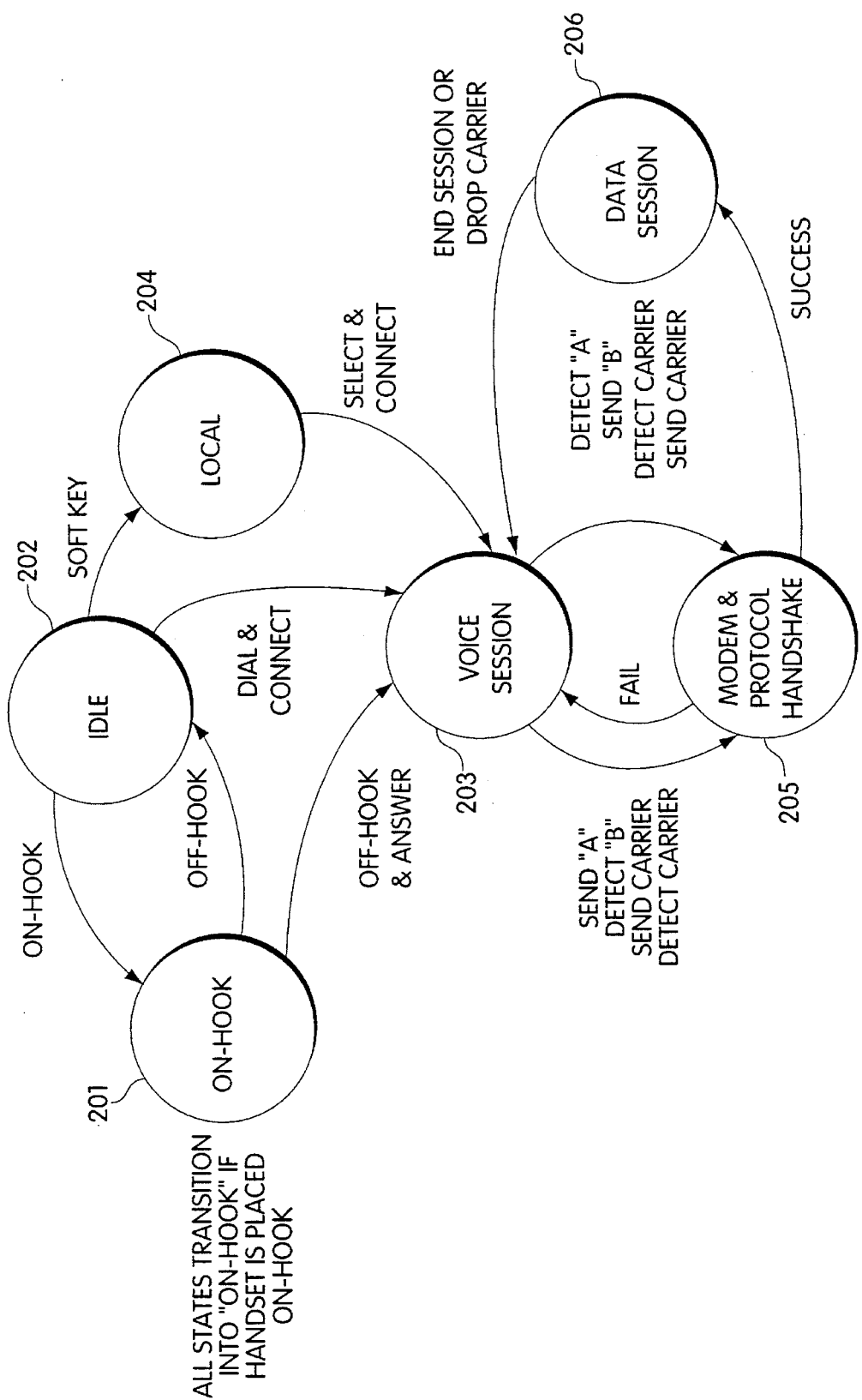
FIG. 2 is a state diagram of one embodiment of the present invention.
Figure 3:
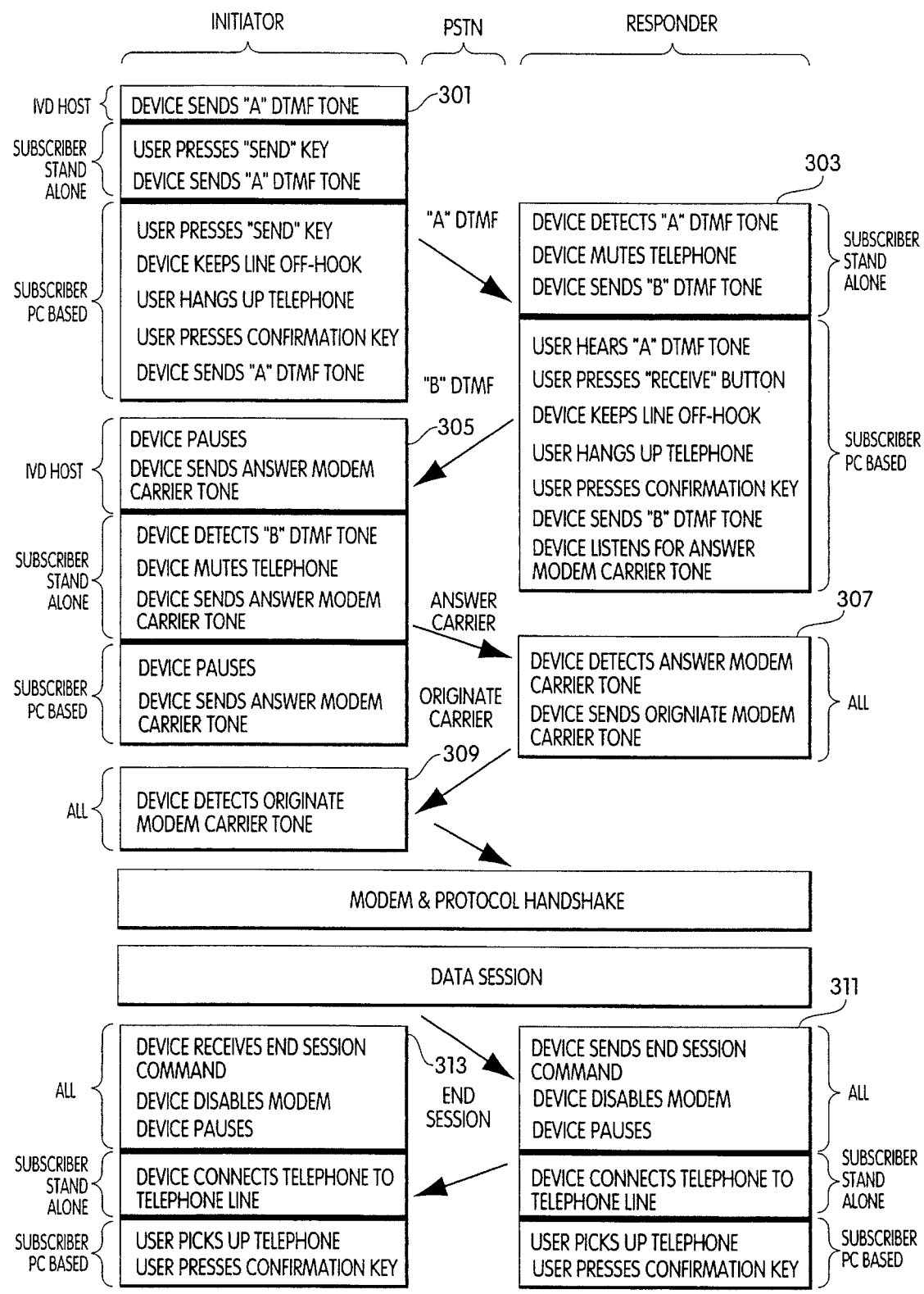
FIG. 3 is a detailed state diagram showing how transitions between voice and data modes are effected.

FIG. 3 details the transition between devices according to the present invention from voice mode into a data communications mode and back to a voice mode. More specifically, FIG. 3 illustrates the transition between the voice session state (FIG. 2, 203) into the modem and protocol handshake state (FIG. 2, 205), and the transition from the data session state (FIG. 2, 206) into the voice session state (FIG. 2, 203).

In FIG. 3, one device according to the present invention has already formed a connection with another device according to the present invention, and both devices are in the voice session state (FIG. 2, 203). FIG. 3 illustrates how either device may cause the other device to establish a data communication link therewith. Accordingly, the device originating the request for a data communication mode to be established is designated the Initiator, while the other device is designated the Responder. The Initiator/Responder designation has no relation to which device originated the telephone call or any previous data communications modes if they took place. Some of the contemplated variations based on various embodiments are shown by joined boxes in FIG. 3, each segment of a box representing a different behavior for the same step. When all of the embodiments perform the same actions, the list of actions is labeled with "All". Furthermore, note that this embodiment uses attention and acknowledgment signals comprising single DTMF tones. However, sequences of tones may alternatively be used to provide a more robust system as discussed above. When the desire to enter a data communications mode exists, the requesting device sends a short DTMF "A" tone and thus establishes itself as the Initiator of the forthcoming data session, step 301. The "A" tone signals the other device that data communication should be established, and designates its role as that of Responder. There are two general cases when a data communications mode is requested (always from the voice session state, FIG. 2, 203): either the initiating device is an IVD host system (or an IVR host system modified specifically to interact with the present invention); or a user desires to transmit information from his device to the PSTN-connected device.

If the initiating device is an IVD host system, the IVD host immediately sends the "A" tone after answering and being connected to the calling device through the PSTN. If the user desires to transmit information from an IVD subscriber system, the user may retrieve data by using functionality found in local state (FIG. 2, 204) and then initiate the data session by hitting the "send" key (FIG. 1, 115). The device then sends the "A" tone. In PC based embodiments, the user may be able to hang up the voice telephone during data transmission, because the device will continue to keep the subscriber loop off hook. Optionally, after hanging up the voice telephone, the user may be required to press a confirmation key. By implementing the PC embodiment so as to require a confirmation key, the user need not be subjected to loud audio tones through the voice telephone. The Initiator device then awaits receipt of a confirming DTMF "B" tone, or if it is a PC based device, may simply pause.

Upon receiving a DTMF "A" tone, the receiving device detects the tone (if it is a stand alone device) or the user hears the tone and presses a "receive" key (if it is a PC based device), step 303. In either case, the device now assumes the role of Responder for the forthcoming data session. If the Responder device is stand alone, then it detects the "A" tone, mutes any attached telephone by disconnecting it from the telephone line interface (FIG. 1, 109) by means of the switch (FIG. 1, 121) and sends a DTMF "B" tone out over the subscriber loop. A PC based device may simply wait for the user to hang up the telephone and press a confirmation key, and then send the "B" tone similarly to the procedure for a PC based sending device. In both embodiments the Responder device then listens for the sending device modem carrier.

At step 305, the Initiator device may now either detect the DTMF "B" tone sent or, if the device lacks means for recognition of DTMF tones, simply pause and assume such a tone was sent. The Initiator device then mutes any attached telephone and its modem asserts an answer carrier tone. At step 307, the Responder device detects the modem answer carrier tone from the Initiator device and sends an originate modem carrier tone. At step 309, the Initiator device detects the originate carrier tone. At this point, the devices enter into the modem and protocol handshake state (FIG. 2, 205). After completing the handshake, the devices enter the data session state (FIG. 2, 206).

When data communication is completed, steps 311 and 313 are followed.

First, in step 311, one of the devices sends an end session command over the PSTN as a data message. In the FIG. 3, the Responder device sends the end session command, although this need not be so. The terminating device then disables its modem. A stand alone device then reconnects the voice telephone to the subscriber loop, so that voice communication may resume. PC based systems without either a plug-in module or a modem capable of handset exclusion may pause for the user to pick up a connected voice telephone and press a confirmation key. Second, when the other device receives an end session command, step 313, it performs the same actions as the terminating device. That is, a stand alone device then reconnects the voice telephone to the subscriber loop, so that voice communication may resume. PC based devices may pause for the user to pick up a connected voice telephone and press a confirmation key.

Figure 4:
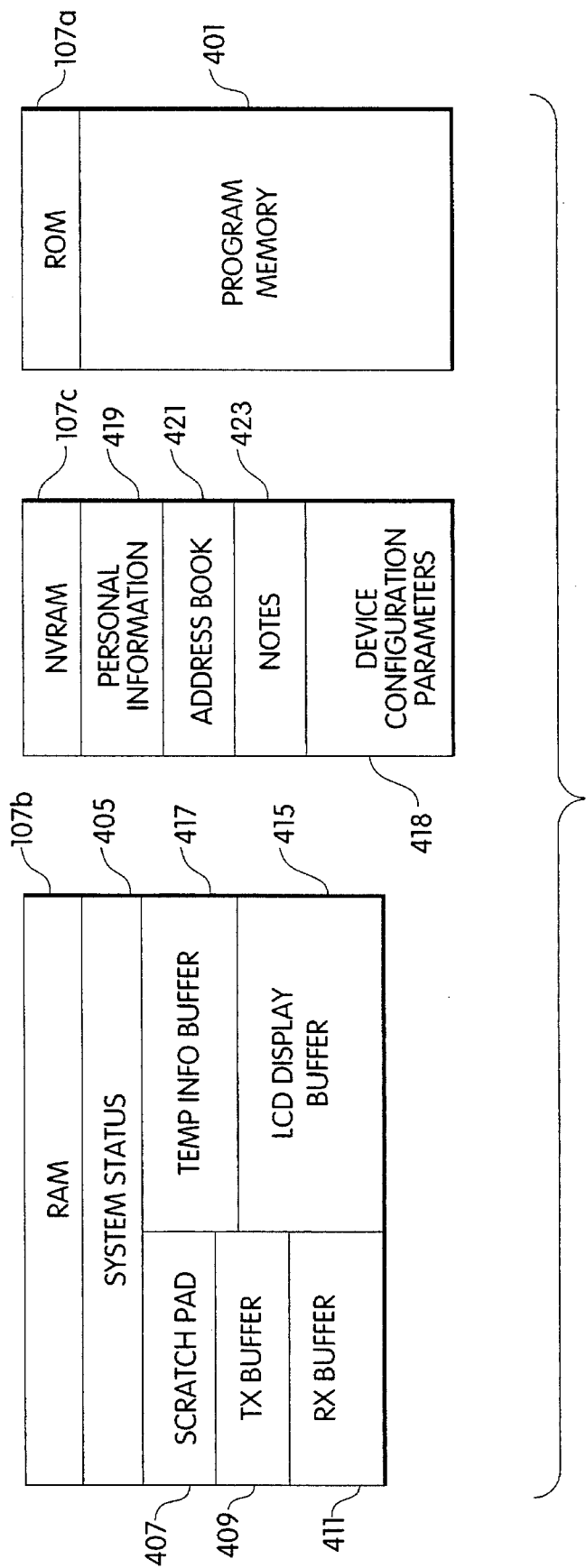
FIG. 4 is a memory map of the contents of memory elements according to one embodiment of the present invention.

One arrangement of data within the memories (FIG. 1, 107a–107c) which supports the functionality of the embodiments illustrated in FIGS. 1–3 is shown in FIG. 4. ROM 107a includes program memory 401 which holds the system program. RAM 107b may hold transient information, including system status 405, a scratch pad area 407, transmit and receive buffers 409 and 411, LCD display buffer 415 and a temporary information buffer 417. NV RAM 107c may hold a database of data including device configuration parameters 418 personal information 419, address book 421 and notes 423. The database held in NV RAM 107c is now described in greater detail.

In one embodiment of the present invention, the database may be implemented as linked lists of null-terminated character strings. Each entry in a linked list of null-terminated character strings is a data structure comprising a pointer to a string of characters and a pointer to the next element in the list. The last entry of a list includes an indication that it is the last entry instead of a pointer to a following entry. some embodiments, the linked list may be doubly linked. That is, each entry may further include a pointer indicating the previous element in the list. A pointer to the first element of each list may be held in a globally accessible memory location.

The string of characters pointed to by each entry represents the contents of that element. The string may be terminated by a data byte whose contents are the binary value zero, which is known as a null-terminator. In embodiments where a null-terminator may be inconvenient or inappropriate, another means of indicating the length or end of the string of characters may be used. For example, the string of characters may comprise a byte indicating the length of the string of characters which follows, followed by the indicated number of characters. The string of characters may have additional internal structure of a nature not relevant to management of the database. For example, the string of characters may include embedded formatting characters. Strings of characters stored as described may be of a variety of semantic types, including types representing names, telephone numbers and text notes. When applicable, the semantic type of each element stored in a list may be indicated by an integer stored in the linked list structure for each element.

Following this general approach, a note 423 portion of the database may comprise a single linked list of entries. Each entry may contain a pointer to a string of characters representing the text of a note, perhaps including embedded line termination characters, and each entry may further contain a pointer to the next entry in the note 423 linked list. The note 423 portion of the database may further include a single memory location containing a pointer indicating the first entry of the note 423 portion linked list.

A personal information 419 portion of the database may be implemented using the same type of data structure. The personal information 419 portion may contain a plurality of linked lists, one for each of the types of data to be stored as personal information. For example, there may be a list of names, a list of addresses and a list of telephone numbers, each of the foregoing lists being of a different semantic type. Other useful semantic types may include credit card numbers and service provider specific data, such as account numbers. Each personal information 419 linked list may be referred to by a master personal information 419 linked list. The master linked list would include entries having pointers to the start of each linked list of the personal information 419 portion of the database, as well as an indication of the semantic type stored in the linked list pointed to. A single memory location may contain a pointer indicating the first entry of the master linked list for the personal information 419 portion of the database.

The address book 421 portion of the database may be implemented as a linked list of entries, each entry containing a name, a telephone dialing string and a linked list of additional information related to that entry. The additional information may be any valid semantic type discussed above. Additional semantic types which may be used in the additional information linked list may include the name of a person's business or organization, address information, additional telephone numbers such as facsimile numbers, whether a telephone number entry requires dialing special prefixes such as an area code or a "1", and perhaps a bookmark, as described elsewhere.

FIG. 5 is a high level system diagram illustrating the interconnection of various embodiments of the present invention. The embodiments include stand-alone IVD subscribers 502 and 504, stand-alone IVD host systems 505, PC-based subscriber systems 501 and 503, and an integrated IVR/IVD host system 506. All of the embodiments are compatible and are capable of establishing voice and data sessions as described elsewhere in this application, in accordance with the present invention. That is, an IVD subscriber system is capable of establishing a data session with another IVD subscriber system, a stand-alone IVD host system, or with an IVR/IVD host system.

The caller devices 501 and 502 may be any IVD subscriber device according to the present invention having the capability to originate telephone calls. The receiver devices 503 and 504 may be an IVD subscriber or host system, or any other device according to the present invention having the capability to receive telephone calls. Typically, the receiver in embodiments practicing this aspect of the invention is known in advance to the caller to have capabilities according to this aspect of the invention. Variations in behavior during some states are contemplated.

The IVR/IVD host system 506 is a combination device that performs both the functionality of a standard IVR and of the present invention. A standard IVR can easily be modified to include the DTMF "A" tone as part of its initial outgoing message. If so modified, then when an IVD subscriber system connects with the IVR/IVD 506, detects the "A" tone, and sends the "B" tone, the IVR/IVD 506 can detect the "B" tone and connect the call to a stand-alone IVD host system or continue processing the call via the integrated IVR and IVD functionality. In order to perform certain functionality, the IVD host system may need to be linked to other computer and information systems at the IVR provider's facilities. Of course the IVR and IVD host systems could be integrated into a single unit.

Figure 6:
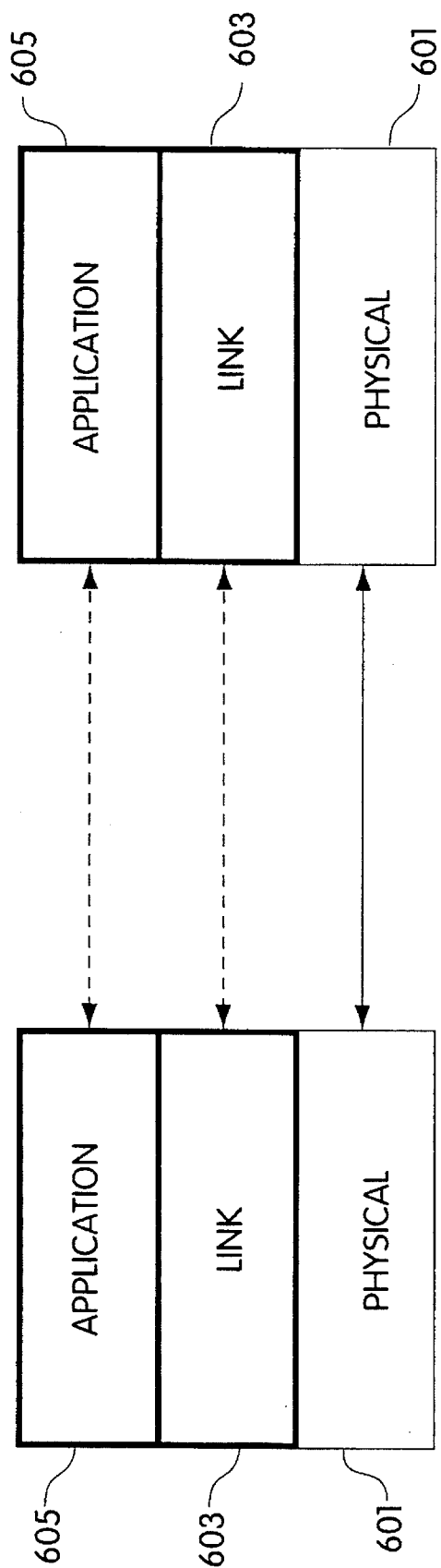
FIG. 6 is a protocol diagram of the communications protocol according to one embodiment of the present invention.

The communication protocols defined for operation of the device are generally represented in FIG. 6. The protocols are layered to depict one of the fundamental approaches of networking technology: lower layers provide services to higher layers, but the higher layers may be implemented without knowledge of how services provided by the lower layers are implemented. In a true layered architecture, the implementation of a particular layer's functionality can change without necessitating any changes to the layers above or below it. Peer layers on either end of the communication line effectively communicate directly with each other, ignoring the actions that the lower layers take on their behalf. While the layering of the protocols is described in the spirit and vocabulary of the Open Systems Interconnection Reference Model, the detailed meanings of the terms here may differ from their use in that paradigm.

The bottom layer, designated the physical layer 601, represents in this instance the standards and interfaces implemented to transmit raw information (e.g. bits of data) over a communications channel. It comprises, for example, the methods the modems use to modulate their carriers for reception and transmission of signals and the electrical interfaces from the device to the telephone exchange. The link layer 603 adds error-free transmission to the raw communications channel provided by the physical layer 601. The application layer 605 uses this robust communications channel to implement functional messaging between devices, to add meaning to the messages.

In the present context, the requirements of the link layer 603 are that it provide error-free transmission and reception of messages, that it preserve the boundaries between messages, and that it regulate the flow of messages so transmitters do not send messages more frequently than receivers can process them.

Those skilled in the art will recognize that the above functionality can be implemented using many present day communications schemes. The scheme presented here draws on the Point to Point Protocol (RFC 1331) of the Internet Engineering Task Force and the general class of sliding window protocols.

A typical link layer 603 protocol will provide specifications for framing a message, adding a header and checksum, and retransmitting a message in the absence of a receive acknowledgment. When the link layer 603 is given data to transmit, it first packages the message into packets. The protocol specifies a maximum packet length, so large data messages will be transmitted as series of packets. A header is created, consisting of, for example, a bit indicating whether this segment is the last (or only) segment of a message, a bit or bits specifying a sequence number, and a bit or bits reserved for acknowledging the last message received from the peer link layer 603, as will be described below.

A checksum is calculated, which conceptually can be as simple as adding together all the bytes of the message. When the peer link layer receives the message, it too adds together all the bytes, and checks if the sum it calculates matches the sum transmitted in the peer's message. If not, it considers the packet invalid and ignores it. Upon receiving many consecutive invalid packets, the device will drop the modem carrier to terminate the data session, and, if appropriate, go back on hook. In practice, a more complicated algorithm called a cyclic redundancy code may be used for the checksum. This algorithm is particularly effective at detecting the type of errors that occur under asynchronous serial data communication. Included in the checksum calculation is the header and data bytes, but not the checksum, flag or escape bytes described below.

The message is transmitted by sending a flag byte, for example the hexadecimal byte 7E, followed by the header, followed by the bytes of data, followed by the checksum, followed again by a flag byte. Because a data byte whose value matches that of the flag byte may occur in the body of the message, a technique called "character stuffing" is used, where a byte of another specified value, for example hexadecimal 7D, is inserted before any such character on transmission. In addition, this byte, called an escape byte, must be inserted before any character whose value matches that of the escape byte. When the peer receives the escape byte, it doesn't include it in the received message, and it treats the next character received as solely a data byte with no special, e.g. flag or escape, handling.

Error recovery and the control of message flow are often handled by the "sliding window" technique. The protocol specifies how many packets may be unacknowledged at a given time. In the present context, for example, it is appropriate to just allow one packet to be unacknowledged. In effect, after every packet is sent, an acknowledgment must come back before the next can be sent. The acknowledgment field in the header of an outgoing packet is set to the sequence number of the last packet successfully received, and if there is no packet waiting to be sent, then a message consisting of just a header (and flag bytes and checksum) can be sent for acknowledgment purposes. When a packet is transmitted, the sending peer starts a timer, and if timer expires before suitable acknowledgment arrives, the packet is retransmitted. It is sufficient in this approach that there be only one more sequence number than the number of unacknowledged frames, so the current protocol uses two sequence numbers, zero and one, and therefore the sequence number and acknowledgment fields of the header are each a single bit.

This scheme requires that both peers do not send their first packet at the same time. However, as described in connection with FIG. 3, initiating a data session unambiguously defines one side as the initiator. The protocol specifies that the initiator send the first packet, even if it is only an empty packet, including only flag bytes, header and checksum, and created expressly for this purpose.

The function of the application layer 605 in the present context is to provide the means to pass typed messages between peers. A typed message is a sequence of characters together with an identifier indicating the meaning of the characters. Message types are used in both an active sense and a passive sense in this invention, in that some message types just indicate what is contained in a message and leave it to the peer to decide what to do with the message, while other message types are actually requests or commands to the peer to perform some action. Passive message types include PERSONAL_INFORMATION, indicating that the message contains personal information from the peer, ADDRESS_BOOK, indicating that the message contains an address book entry, NOTE, where the message contains a text message, and KEY_HIT, where the message contains a representation of the soft key or telephone key last pressed by the user. Message types used as commands include a MENU type which indicates that the message contains a structured menu that should be displayed on the recipient's screen and the user's selection returned, a DISPLAY type which includes text to be displayed on the screen, and a SEND_PERSONAL_INFORMATION type used to request personal information from the peer device.

A protocol for implementing this functionality specifies how typed messages are to be constructed. For example, the protocol states that message types are represented by four byte integers, with PERSONAL_INFORMATION represented as 1, ADDRESS_BOOK as 2, and so on. Thus, any typed message generated by the application layer begins with four bytes representing the appropriate integer, most significant byte first. The application layer protocol further defines the structure of the message contents when appropriate. For example, consider the ADDRESS_BOOK message. Elements of this message are the description of the address book entry and the typed data records it comprises. Each data record type is defined as an integer by the protocol, e.g. NAME is 10001, ADDRESS is 10002, and so on. For convenience and clarity, but not out of necessity, the integers used to represent message types and those used to represent data types are drawn from separate pools of numbers, e.g. data record types are greater than 10000 in the above example. A complete ADDRESS_BOOK message comprises the four byte ADDRESS_BOOK message type, followed by the null terminated description, followed by the four byte integer representing the type of the first data record, followed by the null terminated contents of the first data record, followed by the type of the second data record, and so on.

The scope and functionality of the application layer 605 is illustrated by reference to two types of data sessions: the peer to peer data session, where, for example, two IVD subscriber devices exchange data messages, and the master/slave data session, where, for example, an IVD host is connected to an IVD subscriber unit and the host commands the subscriber unit to display text and return any key presses made by the user.

In the peer to peer data session, two users with IVD subscriber units establish voice communication and then initiate a data session as described above in connection with FIGS. 2 and 3. They next use the means for creating, sending, and receiving data records to pass notes to each other. If one of the IVD subscriber units is a PC embodiment of the invention, for example, that embodiment may allow the user to transmit either a file stored on the PC or the contents of the PC display. The receiving peer can then use the functionality described above as local mode functionality to store, edit, and view the message. Or, one peer can pass data described above as personal information to the other, and the other peer can use the information to build an address book entry.

The user who wishes to send data uses appropriate means to either create a data record or select a stored data record, and then, using a soft key (FIG. 1, 113) or a menu selection, instructs the device to send the data record. The device initiates a data session if necessary, then uses the application layer 605 functionality to generate an appropriate typed message, and then uses the link layer 603 and physical layer 601 functionality to send the message across the communications channel. If the message is of type NOTE, then the receiving unit displays the contents as a note, and the user can examine and, if desired, store it in the unit's database. If the message is of the type PERSONAL_INFORMATION or ADDRESS_BOOK, then the receiving unit has just received information detailing either the peer device's user's name and address or a third party's name and address, and the receiving unit's user can elect to store the set of data records contained in the message as an address book entry in the database, or to merge the data records with an existing address book entry.

A typical scenario for the master/slave mode of interaction is that the user of an IVD subscriber system dials an IVD host system and the two systems begin a data session, as described in connection with FIGS. 2 and 3. In this context the IVD host system sends commands to the IVD subscriber system. For example, the IVD host could ask the subscriber system to clear the display, to place the text "Hit 1 for customer service, 2 for sales" on the second and third lines of the display, and to return to the host system the number of the telephone keypad button pressed by the user.

Typical elements of a master-slave interaction include: the master asks the slave to send its device capabilities (the number of rows and columns on the display, the number of soft keys, and the sizes of internal communications buffers, for instance) and its user preference settings; the master asks the slave to display a message and then send back all the slave device's user's key presses; the master asks the slave to send the contents of personal information records of particular types; and the master asks the slave to display a set of menu choices and return the user's selection.

For each of these interactions, there are appropriate messages defined in the application layer protocol. As an example, consider the generation and processing of a request for a personal information data record of type NAME. The application layer protocol dictates that the message should be built by catenating the four byte SEND_PERSONAL_INFORMATION command with the four byte data record type NAME. The message is handed to the link layer for transmission. The data record arrives at the slave device, which then displays to its user a list of all the NAME personal information data records in the database, prompting the user to select one to send to the master. Alternatively, the user may have used local mode to set the current default identity of the slave unit (for example, to "Mr. Smith at work") and the unit simply asks the user to confirm the sending of the currently selected name. In either case, the slave's response to the master is a PERSONAL INFORMATION message containing a NAME data record. The application command protocol further allows the master to request several personal information records (for example NAME, ADDRESS, and TELEPHONE NUMBER) in a single request, and the slave unit will decide the best way to elicit the complete response from the user.

Further functionality embedded in the application layer that is useful in the master/slave data session includes bookmarks and callbacks, described now in further detail.

One choice a user may be given during the interaction with a host is to set a bookmark. In response, the master will send enough information to the slave to create an address book entry that can be used by the autodial means. In addition, the master sends a data record of type BOOKMARK, to be stored as part of the address book entry, whose contents can be any string of bytes that will be meaningful to the master in a subsequent data session. When the user later uses the autodial means to call the service and the host and subscriber units begin a data session, the slave can transmit the bookmark data record early in the session. Or, the user can elect to transmit the bookmark at some appropriate time during an existing data session.

There are several potential uses of the bookmark facility. One is as a way to connect the user to a desired endpoint at the IVD host, for example to a particular menu or a particular phone extension. Thus, the user need only navigate the service's options once, request a bookmark, and in subsequent calls return immediately to that state. This could either be a state the user wishes to return to often, for example the display of his current bank balance, or just once, for example if the user had to terminate the call to the service after only completing half the task he set out to do. More generally, the user may define, through menus and data entry, a query. Then using the bookmark would be analogous to periodically re-entering the query.

The implementation of the bookmark will be specific to the service performed by the host system. If the host system is used to forward calls to particular telephone extensions by presenting a list of all the extensions to the caller, then a bookmark set after choosing a particular extension could simply be a string of digits representing the extension number. If the service presents a series of menus to the caller, and a bookmark is used to return the user to a particular menu, then the bookmark could be either an application specific label for the menu, e.g. a menu number known to the host system software, or it could be an encoding of the sequence of keystrokes that led the user to the particular menu, and upon receipt of the bookmark the host system replays the sequence. Note that a bookmark can encapsulate any of the information that defines the state of a data session. If the IVD host system is used by a caller to check a bank account balance, then a bookmark requested when the subscriber unit is displaying the balance could include the user's account number, and upon subsequent receipt of the bookmark the host system would not need to query the user for the account number.

Like the bookmark option, the user may be offered the callback option in the course of a master/slave data session. This functionality allows the user to hang up the phone yet maintain priority when waiting to access a limited resource. This both eliminates annoying waits for the user and saves the host telephone charges associated with customers hanging on service lines.

If the user makes a selection involving a limited resource, such as requesting to speak to a support person, and there is a queue of requests for that resource, the user may be given the opportunity to be called back. The user selects the callback option, and the host requests name and telephone personal information records and perhaps other information, such as the nature of the problem or an account number. The host uses this information to build a service request and places the request in a queue. As resources become available, the host scans the queue, calls back those who have left requests, and connects them to the resource.

The invention has now been described in connection with a number of particular embodiments and illustrations. The particular embodiments and illustrations are provided by way of example only. Many variations and modifications to these embodiments would be obvious to those skilled in the art. Such variations and modifications are contemplated as falling within the scope of the present invention, which is limited only by the appended claims.

What is claimed is:

1. An interactive voice and data response (IVD) system for alternately effecting voice communication and data communication between an IVD host system and an IVD subscriber system over a public switched telephone network (PSTN) having a plurality of subscriber loops, comprising:

the IVD subscriber system having means for connecting the subscriber system to a PSTN subscriber loop;

means for selectively connecting the subscriber system to a voice communication means;

means for performing data communications, operatively connected to the means for connecting the subscriber system to the PSTN subscriber loop;

means for displaying data messages received by the means for performing data communications;

means for receiving dual-tone multi-frequency (DTMF) signals from the voice communication means, connected to the means for selectively connecting;

means for controlling subscriber system operation, including means for causing the means for selectively connecting to connect the subscriber system to the voice communication means when voice communication occurs, means for causing the means for selectively connecting to disconnect the subscriber system from the voice communication means when data communication occurs, means for creating data messages for sending by the means for performing data communications, means for encoding received DTMF signals as a response data message, operatively connected to the means for receiving DTMF signals, and means for transferring the response data message to the means for performing data communications to the IVD host system; and the IVD host system for automatically recognizing the IVD subscriber system and performing data communication therewith and for performing voice communication when the IVD subscriber system is not recognized.

2. An IVD system as recited in claim 1, wherein said IVD host system further comprises:

means for connecting the host system to a PSTN subscriber loop;

means for selectively connecting the host system to a voice communication means;

means for performing data communications, operatively connected to the means for connecting the host system to the PSTN subscriber loop; and means for controlling host system operation, for causing the means for selectively connecting to connect the host system to the voice communication means when voice communication occurs and for causing the means for selectively connecting to disconnect the host system from the voice communication means when data communication occurs, and for creating data messages for sending by the means for performing data communications.

3. An interactive voice and data response IVD host system for communicating with a plurality of callers over a public switched telephone network (PSTN), the plurality of callers including at least one IVD subscriber system, the IVD host system alternately effecting voice communication and data communication with the at least one IVD subscriber system, the IVD host system comprising:

means for establishing a communication channel with a caller over the PSTN;

data communication means for establishing a full-duplex bidirectional data link over the communication channel, and for transferring data messages to and receiving data messages from the caller over the data link;

voice communication means for communicating voice messages with the caller over the .communication channel;

recognition means for recognizing whether the caller is the at least one IVD subscriber system;

means, coupled to the recognition means, for enabling the data communication means to transfer data messages to the caller when the caller is the at least one IVD subscriber system; and means, coupled to the recognition means, for selecting an introductory message to be transferred to the caller so that the introductory message is a data message when the caller is the at least one IVD subscriber system and is a voice message when the caller is not the at least one IVD subscriber system.

4. An IVD host system as recited in claim 3, wherein the recognition includes: means includes:

means for transferring a dual-tone multi-frequency (DTMF) tone to the caller;

means for receiving a DTMF tone from the caller; and means for recognizing the DTMF tone received from the caller as indicated whether the caller is the at least one IVD subscriber system.

5. A device for managing data which communicates with another device over a public switched telephone network (PSTN), wherein said another device may enter one of a plurality of states, said device comprising:

a user interface that receives inputs from a user;

means, electrically connectable to the PSTN, for creating signals for establishing a communication channel between the device and the another device through the PSTN;

means for establishing a full-duplex bidirectional data link through the communication channel;

means for holding data in a database of records including telephone number data and other related information;

means for receiving a database record including telephone number data over the full-duplex bidirectional data link from the another device;

means, coupled to the user interface, for creating a database record including telephone number data for storage in the means for holding data based upon inputs received from the user;

means for merging, into the database held in the means for holding data, a database record of data created by the means for creating a database record and a database record received by the means for receiving a database record to form a merged database of records;

means for retrieving a database record from the merged database of records;

means for causing the means for creating signals to automatically dial a telephone number in accordance with telephone number data in the database record retrieved by the means for retrieving;

means for transmitting signals over the PSTN;

means for creating data;

means for sending data from a database record retrieved by the means for retrieving and for sending data created by the means for creating data using the means for transmitting signals;

means for ascertaining from said another device a desired state of said another device at one point in time; and means for using the results of said ascertaining to cause said another device to return to said desired state at a later point in time at which said another device is not in said desired state.

6. A device as recited in claim 5, wherein said device further comprises:

means for receiving data representing the state using the means for receiving;

means for merging a database record of data representing the state received by the means for receiving into the database, forming merged database records;

means for retrieving a database record from the merged database of records held in the means for holding data; and means for sending the retrieved database record using the means for transmitting.

7. A device for data communications over a voice and data network with at least one other device, comprising:

means, electrically connectable to the voice and data network, for establishing a communication channel between the device and the at least one other device through the voice and data network;

means for establishing a full-duplex bidirectional data link through the communication channel;

means for connecting the device to a voice communications means with a capability to generate dialing signals;

means for detecting each dialing signal from said voice communications means and for converting each dialing signal to a data signal for transmission over the full-duplex bidirectional data link, whereby the detection of each dialing signal results in the transmission of a corresponding data signal;

means for visually displaying information; and means, electrically connectable to the voice and data network, for detecting a received signal over the voice and data network and for converting said received signal to a display signal to control the means for visually displaying information, whereby the detection of the received signal results in the display of corresponding information.

8. A device for data communications with at least one other device over a public switched telephone network (PSTN), comprising:

means, electrically connectable to the PSTN, for establishing a communication channel between the device and the at least one other device through the PSTN;

means for establishing a full-duplex bidirectional data link through the communication channel;

means for connecting the device to a voice communications means with a capability to generate dialing signals;

means for detecting dialing signals from said means for voice communications and for converting each dialing signal to a transmit modem signal for transmission over the full-duplex bidirectional data link, whereby the detection of each dialing signal results in the transmission of a corresponding transmit modem signal;

means for visually displaying text communications; and means, electrically connectable to the PSTN, for detecting receive modem signals for transmission over the PSTN and for converting said received modem signals to display signals to control the means for displaying text communications, whereby the detection of receive modem signals results in the display of corresponding text information.

9. A device as recited in claim 8, wherein the means for detecting dialing signals comprises:

means for detecting dual-tone multi-frequency signals.

10. A device as recited in claim 8, wherein the means for detecting dialing signals comprises:

means for detecting and timing switch hook activity of the voice communications means.

11. A device for data communications with another device over a PSTN, wherein said another device may enter one of a plurality of states, said device comprising:

means for connecting the device to a voice communications means with data signal generation capability;

means for alternately performing voice and data communications, the voice communications being performed over a voice link through the PSTN, the data communications being performed over a full-duplex bi-directional data link through the PSTN;

means for creating signals for establishing a connection through the PSTN;

means, electrically connectable to the PSTN, for receiving signals from said another device over the PSTN, the signals received including data signals received over the full-duplex bi-directional data link;

means for receiving telephone number data over the full-duplex bi-directional data link from the means for receiving signals;

means for holding telephone number data received by the means for receiving telephone number data;

means for retrieving telephone number data from the means for holding telephone number data;

means for dialing a telephone number corresponding to the retrieved telephone number data using the means for creating signals;

means for ascertaining a desired state of said another device at one point in time; and means for using the results of said ascertaining to cause said another device to return to said desired state at a later point in time.

12. A device for managing data and communicating with another device over a public switched telephone network (PSTN), wherein the another device may be in one of a plurality of states, the device for managing data comprising:

means, electrically connectable to a PSTN subscriber loop, for creating signals for establishing a connection through the PSTN;

means for receiving signals over the PSTN from the another device;

means for holding data in a database including telephone number data and other related information;

means for receiving data from the means for receiving signals;

means for storing in the database held in the means for holding data, data received by the means for receiving data;

means for retrieving data from the database;

means for causing the means for creating signals to dial a telephone number in accordance with telephone number data retrieved by the means for retrieving;

means for ascertaining from said another device a desired state of said another device; and means for using the results of said ascertaining to cause said another device to return to said desired state at a later point in time at which said another device is not in said desired state.

13. A device as recited in claim 12, wherein said device further comprises:

means for receiving data representing said desired state using the means for receiving data.

14. A device as recited in claim 13, wherein said device further comprises:

means for transmitting signals over the PSTN; and means for sending data retrieved by the means for retrieving using the means for transmitting signals.

15. A method for telephonically communicating, via a first device, with a second device having a plurality of states, the first and second devices each being coupled to a public switched telephone network (PSTN), the first device having a storage element, the method comprising the steps of:

A. establishing a first communication channel through the PSTN between the first and second devices; the second device from the storage element; and J. transferring the retrieved data from the first device to the second device over the second communication channel so that the second device reenters the selected state.

16. The method for telephonically communicating as recited in claim 15, wherein the data identifying the selected state is a label recognized by the second device as identifying the selected state.

17. The method for telephonically communicating as recited in claim 15, wherein the data identifying the selected state includes a series of commands, each of which corresponds to an option presented during a respective state of the second device, so that execution of the series of commands causes the second device to enter the selected state.

18. The method for telephonically communicating as recited in claim 15, wherein:

step H includes establishing a second bidirectional data link between the first and second devices over the second communication channel.

19. The method for telephonically communicating as recited in claim 18, further including the steps of:

K. breaking the second data link; and

L. establishing a voice link between the first and second devices over the second communication channel.

20. The method for telephonically communicating as recited in claim 15, further including, prior to executing step J, the steps of:

establishing a voice link between the first and second devices over the second communication channel;

communicating over the voice link;

breaking the voice link; and establishing a data link between the first and second devices over the second communication channel.

21. The method for telephonically communicating as recited in claim 15, wherein:

step J includes transferring the retrieved data from the first device to the second device prior to receiving any communication from the second device over the second communication channel.

22. The method for telephonically communicating as recited in claim 15, wherein the selected state represents an endpoint in a transaction between the first and second devices.

23. The method for telephonically communicating as recited in claim 15, wherein the second device has a telephone number that uniquely identifies the second device on the PSTN, and wherein:

step A includes dialing the telephone number of the second device.

24. The method for telephonically communicating as recited in claim 15, wherein step C is performed before step B, wherein the at least one option is presented by the second device over the first bidirectional data link, and wherein step B includes a step of responding over the first bidirectional data link.

25. A method for telephonically communicating, via a first device, with a second device, the first device having a plurality of states, the first and second devices each being coupled to a public switched telephone network (PSTN), the method comprising the steps of:

A. establishing a first communication channel through the PSTN between the first and second devices;

B. presenting at least one choice of alternatives to the second device over the first communication channel, the at least one choice defining at least two alternate states of the first device that can be entered in response to at least one command;

C. receiving at least one command from the second device over the first communication channel and entering a selected state of the first device in response thereto;

D. establishing through the first communication channel a first bidirectional data link that preserves data bits transferred over the data link;

E. transferring data bits identifying the selected state over the first bidirectional data link from the first device to the second device to be stored in the second device; and F. breaking the first communication channel between the first and second devices.

26. The method for telephonically communicating as recited in claim 25, wherein step D is performed before steps B and C, wherein step B includes a step of presenting the at least one choice of alternatives to the second device over the first bidirectional data link, and wherein step C includes a step of receiving the at least one command from the second device over the first bidirectional data link.

27. A method for telephonically communicating, via a first device, with a second device, the first device having a plurality of states, the first and second devices each being coupled to a public switched telephone network (PSTN), the method comprising the steps of:

A. establishing a first communication channel through the PSTN between the first and second devices;

B. presenting at least one choice of alternatives to the second device over the first communication channel, the at least one choice defining at least two alternate states of the first device that can be entered in response to at least one command;

C. receiving at least one command from the second device over the first communication channel and entering a selected state of the first device in response thereto;

D. establishing through the first communication channel a first bidirectional data link that preserves data bits transferred over the data link;

E. transferring data bits identifying the selected state over the first bidirectional data link from the first device to the second device to be stored in the second device;

F. breaking the first communication channel between the first and second devices;

G. establishing a second communication channel through the PSTN between the first and second devices;

H. receiving from the second device data identifying the selected state over the second communication channel; and I. entering the selected state of the first device.

28. The method for telephonically communicating as recited in claim 27, wherein step E includes transferring a label recognized by the first device as identifying the selected state.

29. The method for telephonically communicating as recited in claim 27, wherein:

step C includes storing the at least one command received from the second device; and step E includes transferring data representing the at least one command received from the second device.

30. The method for telephonically communicating as recited in claim 27, wherein:

step G includes establishing a second bidirectional data link between the first and second devices over the second communication channel.

31. The method for telephonically communicating as recited in claim 30, further including the steps of:

J. breaking the second data link; and

K. establishing a voice link between the first and second devices over the second communication channel.

32. The method for telephonically communicating as recited in claim 27, further including, prior to executing step H, the steps of:

establishing a voice link between the first and second devices over the second communication channel;

communicating over the voice link;

breaking the voice link; and establishing a data link between the first and second devices over the second communication channel.

33. The method for telephonically communicating as recited in claim 27, wherein:

step H includes receiving from the second device the data identifying the selected state before communicating any message from the first device over the second communication channel.

34. The method for telephonically communicating as recited in claim 27, wherein step D is performed before steps B and C, wherein step B includes a step of presenting the at least one choice of alternatives to the second device over the first bidirectional data link, and wherein step C includes a step of receiving the at least one command from the second device over the first bidirectional data link.

35. A method for telephonically communicating, via a first device, with a second device, the first device having a plurality of states, the first and second devices each being coupled to a public switched telephone network (PSTN), the method comprising the steps of:

A. establishing a first communication channel through the PSTN between the first and second devices;

B. presenting at least one choice of alternatives to the second device over the first communication channel, the at least one choice defining at least two alternate states of the first device that can be entered in response to at least one command;

C. receiving at least one command from the second device over the first communication channel and entering a selected state of the first device in response thereto;

D. establishing through the first communication channel a first bidirectional data link that preserves data bits transferred over the data link;

E. transferring data bits identifying the selected state over the first bidirectional date link from the first device to the second device to be stored in the second device; and F. breaking the first communication channel between the first and second devices;

wherein the selected state represents an endpoint in a transaction between the first and second devices.

36. A method for telephonically communicating, via a first device, with a second device, the first device having a plurality of states, the first and second devices each being coupled to a public switched telephone network (PSTN), the method comprising the steps of:

A. establishing a first communication channel through the PSTN between the first and second devices;

B. presenting at least one choice of alternatives to the second device over the first communication channel, the at least one choice defining at least two alternate states of the first device that can be entered in response to at least one command;

C. receiving at least one command from the second device over the first communication channel and entering a selected state of the first device in response thereto;

D. establishing through the first communication channel a first bidirectional data link that preserves data bits transferred over the data link;

E. transferring data bits identifying the selected state over the first bidirectional data link from the first device to the second device to be stored in the second device; and F. breaking the first communication channel between the first and second devices;

wherein the first device has a telephone number that uniquely identifies the first device on the PSTN, and wherein:

step A includes responding to the second device dialing the telephone number of the first device.

37. A method for telephonically communicating, via a first device, with a second device having a plurality of states, the first and second devices each being coupled to a public switched telephone network (PSTN), the first device having a storage element, the method comprising the steps of:

A. establishing a first communication channel through the PSTN between the first and second devices;

B. establishing through the first communication channel a first bidirectional data link that preserves data bits transferred over the data link;

C. responding to at least one option presented by the second device to cause the second device to enter a selected state of the second device;

D. receiving over the first bidirectional data link, at the first device, a plurality of data bits that includes data identifying the selected state;

E. storing the data identifying the selected state in the storage element;

F. breaking the first communication channel between the first and second devices;

G. establishing a second communication channel through the PSTN between the first and second devices;

H. retrieving the data representing the selected state of the second device from the storage element; and I. transferring the retrieved data from the first device to the second device over the second communication channel so that the second device reenters the selected state.

38. The method for telephonically communicating as recited in claim 37, wherein the data identifying the selected state is a label recognized by the second device as identifying the selected state.

39. The method for telephonically communicating as recited in claim 37, wherein:

step G includes establishing a second bidirectional data link between the first and second devices over the second communication channel.

* * * * *